UNITED STATES PATENT OFFICE.

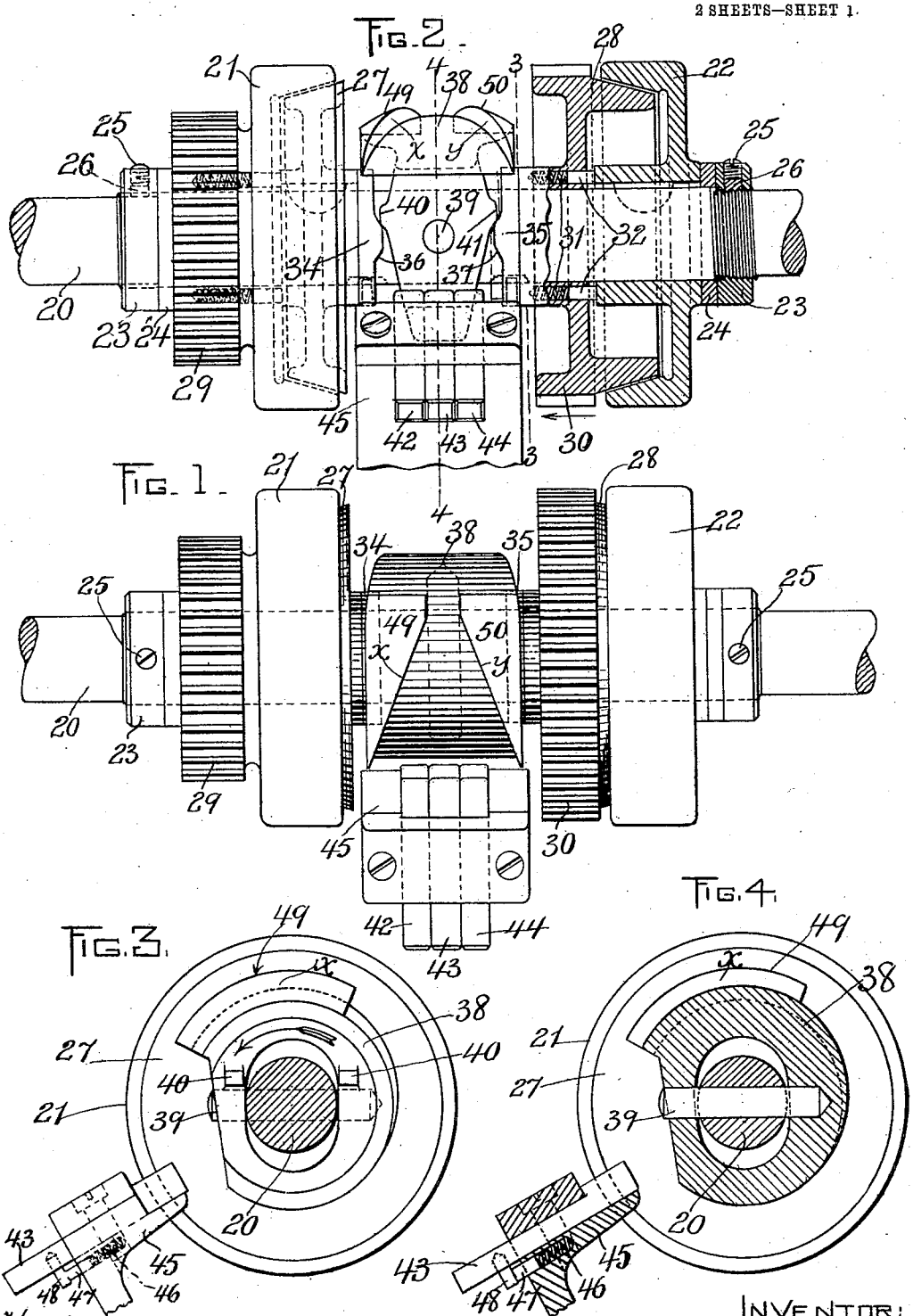

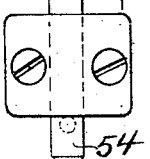

JAMES HARTNESS, OF SPRINGFIELD, VERMONT.

CLUTCH MECHANISM.

No. 870,288.        Specification of Letters Patent.        Patented Nov. 5, 1907.

Application filed March 20, 1903. Serial No. 148,717.

*To all whom it may concern:*

Be it known that I, JAMES HARTNESS, of Springfield, in the county of Windsor and State of Vermont, have invented certain new and useful Improvements in Clutch Mechanism, of which the following is a specification.

This invention has relation to mechanical appliances, and has for its object to provide means for moving one or two rotary members axially with relation to the other by the power of the driving shaft rather than relying on the strength of the operator to accomplish that end. It has heretofore been proposed to accomplish this end in a general way in clutch or other mechanisms by complicated mechanism, including worms and mechanism for gearing one of the worms to the rotating shaft, but such mechanisms are costly, cumbersome, and incapable of long continued use.

According to the illustrated embodiment of my invention, an actuator, such as a cam, is mounted upon the driving member or shaft, and it may be moved into such position by a stationary abutment that it will force two clutch members together. Means are further devised by which the actuator may be employed for the purpose of actuating the movable members of two clutch mechanisms upon the same shaft, being provided with a double set of cam surfaces. The actuator is secured upon the shaft so as to rotate therewith, and yet is so pivotally mounted upon the shaft that it may oscillate about its pivot so as to be brought into engagement with either of said movable clutch members.

Referring to the drawings,—Figure 1 represents in plan view a clutch mechanism embodying the invention. Fig. 2 represents a front elevation of the same, with one of the clutches in section. Fig. 3 represents a section on the line 3—3 of Fig. 2. Fig. 4 represents a section on the line 4—4 of Fig. 2. Fig. 5 represents a section similar to Fig. 4, and illustrates one of the cam dogs in the act of operating the cam. Fig. 6 represents a view looking in the direction of the arrow in Fig. 5, and showing the clutch in section. Fig. 7 represents a face view of one of the clutch mechanisms. Fig. 8 represents a longitudinal section through the mechanisms. Fig. 9 represents another embodiment of the invention, the same being shown in plan view. Fig. 10 represents a section on the line 10—10 of Fig. 9. Fig. 11 represents a section on the line 11—11 of Fig. 9. Fig. 12 represents in end view one of the cam-operating dogs.

On the drawings:—The shaft 20 constitutes the driving member, the precise form of which is immaterial, and in lieu of which any rotating body may be employed. Upon this shaft are placed two clutch members 21 22. Each of these two members is held against longitudinal movement by a collar 23 screwed on the shaft and a washer 24. The collar in each case is secured after adjustment by a set-screw 25 and a bearing block or pin 26, the end of which is grooved to fit the threads on the shaft and prevent their injury when the screw is driven home.

Each of the two members 21 22 is provided with an internally beveled rim for frictional engagement with a complemental member. The member 22 is keyed to the shaft so as to rotate therewith, whereas the member 21 is loose upon the shaft, and is formed with a spur-gear 29 on its hub. The two movable clutch members are indicated at 27 28 respectively. The member 27 is splined upon the shaft 20 so as to be capable of longitudinal movement thereon, whereas the member 28 is adapted to rotate loosely upon the shaft except when clutched to the member 22. Of the two clutches, the member 22 of one clutch is the driving member, although it is held against longitudinal movement on the shaft, whereas in the other clutch, the member 27, though movable longitudinally, is the driving member. The member 28 is formed in its periphery with gear teeth to constitute a gear 30 which is greater in diameter than the gear 29 so that the two gears may be intermeshed with proper gears on another shaft or body, so as to impart a differential rotation thereto. The hub of the clutch member 28 is provided with sockets parallel to its axis, in which are placed coiled springs 31. These springs bear against pins 32 which project from said sockets and press against the hub of the member 22. The clutch member 21 is likewise provided with similar sockets for the reception of springs 33, bearing against pins 341, the projecting ends of which press against the hub of the member 27. These springs and pins tend to move the movable members 27 28 to inoperative or unclutched position at the proper time, as will be explained.

Placed against the hubs of the members 27 28 are two collars 34 35 which are splined to the shaft so as to rotate therewith but be capable of longitudinal movement thereon, and said collars are formed with confronting cam portions 36 37 respectively. They are separated, as shown, to receive between them a cam-member or actuator indicated as a whole at 38. This cam-member is pivotally supported upon a pin or pivot 39, which passes through the shaft 20 so that the cam may rock in lines longitudinal of the shaft. The said cam is provided with outwardly projecting swells 40 41, for engagement with the cams 36 37 upon the collars 34 35 respectively. When the cam is in an intermediate or neutral position, as shown in Fig. 1, both clutch members 27 28 are unclutched from their complemental members 21 22 but by swinging said cam to the right or to the left, the members 27 28 may be forced into clutched relation with their complemental members, as will be readily understood.

For the purpose of actuating the cam, one or more dogs, which are in the nature of abutments, may be employed. For the mechanism shown in Figs. 1 to 8, inclusive, three dogs 42 43 44 are mounted in a suitable support 45, in proximity to the cam; each dog being normally held in a retracted or inoperative position by a spring 46 and pin 47, bearing against a pin or projection 48 extending laterally from the dog, as shown in Fig. 5.

Each dog may be manually projected into engagement with the cam to effect the actuation of the cam. To this end, the cam is curved in the direction of its periphery with two raised portions 49 50, the edges of which converge so as to form cam surfaces $x$ $y$, respectively. The most contracted portion of the space between the cam edges $x$ $y$ is wide enough to receive either one of the dogs or keys, as they may be termed, 42 43 44.

The cam portions on the periphery of the rocking cam are so related to the pivot 39 that when one of the dogs is projected into the space between the cam edges $x$ $y$, the cam will be rocked in one direction or the other, either into position to clutch the member 27 or the member 28 to its complemental member or to bring the cam to neutral position as shown in Figs. 1 and 2.

The operation of the devices is as follows:—Assuming that the rocking cam or "rocker", as it may be termed, for brevity, is in a neutral position, as shown in Figs. 1 and 2, and that it may be desired to move the member 27 into clutched relation to its complemental member 21, the dog or key 42 may be forced inward manually by the operator. As the shaft rotates in the direction of the arrow in Fig. 3, the cam surface $x$ engages the end of the dog, and the cam is rocked laterally to the position shown in Fig. 6, with the result that the cam projection 40 engages the cam projection 36 on the collar 34 and forces the member 27 against the tension of the springs 33 into frictional engagement with the member 21 so as to connect the gear 29 to the shaft 20. It will be observed from Fig. 2 that the cam projections 36 37 on the collars 34 35 are in alinement with the end of the pivot 39 and that the projections 40 41 on the rocker are in a line parallel to the line connecting the cam projections 36 37. The relation of the various cams is such, however, that when the rocker is oscillated about its axis, the cam projection 40 or 41 is swung into the said line connecting the projections 36 37 and the pin 39, and will remain in that position until the rocker is positively moved in the opposite direction.

It is evident that this construction may be varied as desired. For instance, in Figs. 9 to 12, inclusive, another embodiment of the invention is illustrated in which the keys are provided with the cam surfaces for actuating the rocker. In this case, the keys which are indicated at 53 54 are mounted on opposite sides of the shaft, and are provided on their ends with cam surfaces $x'$ $y'$, corresponding to the surfaces $x$ $y$ respectively on the rocker. The rocker is pivoted upon the pin 39, as before described, but it consists of a yoke 55 having the cam-projections 41 42, but also having an arm 56 which is adapted to engage a cam surface $x'$ $y'$, as the shaft rotates. With this construction, the rocker may be pivoted to the shaft or to a pulley so as to clutch the pulley to the shaft. The operation of the rocker with respect to the movable clutch members is substantially the same as that hereinbefore described.

Having thus explained the nature of the invention, and described a way of constructing and using the same, although without attempting to set forth all of the forms in which it may be made, or all of the modes of its use, I declare that what I claim is:—

1. In combination, a shaft, two members having complemental engaging surfaces, one of said members being fixed to said shaft and the other loose thereon, and one of said members being axially movable with respect to the other, a non-rotary device, means for holding said device against movement in lines parallel to the axis of said shaft, and an actuator pivoted to said shaft, and adapted when engaged by said device to move on its pivot and move said axially-movable member relatively to both said device and said actuator.

2. In combination, a support, two rotatable members on said support having complemental engaging faces, of which members one is axially movable with respect to the other, an actuator pivoted on said support and having means for moving one of said members axially relatively to said actuator into engagement with the other member and holding it against reverse movement, whereby said members are caused to rotate together; and a stationary abutment for intermittently engaging and moving said actuator.

3. In combination, a support, two members on said support of which one is axially movable with respect to the other said members having complemental engaging surfaces, an actuator pivoted upon said support and having a cam for moving one of said members axially and holding it against reverse movement, and means for oscillating said actuator.

4. In combination, two rotary members having complemental engaging surfaces, one of said members being movable axially with respect to the other, non-rotary devices, relatively to which said members rotate, held against movement in lines parallel to the axes of said members, and an actuator rotatable with one of said members but movable relatively thereto when engaged by said non-rotary devices to impel the movable member axially in either direction with relation to the actuator and to the other of said members without stopping the rotation of said actuator.

5. In combination, two rotary members of which one is axially movable with respect to the other, an actuator rotatable with one of said members but pivoted independently thereof and movable relatively thereto to effect the axial actuation of the movable member, and a non-rotary member adapted to be projected into the path of the actuator in consequence of which said actuator swings it about its pivot and causes the axial movement of said movable member relatively to both said actuator and the other member.

6. In combination, two rotary members having complemental surfaces for engagement, one of said members being axially movable with respect to the other, an actuator rotatable with one of said members supported independently of said member and movable relatively thereto to impel said movable member axially to cause the engagement or disengagement of said surfaces, and independent keys for engagement with said actuator to move it in one direction or the other.

7. In combination, two rotary members of which one is axially movable with respect to the other, an actuator connected to one of said members to rotate therewith, but supported independently thereof and movable relatively thereto, said actuator and the movable member having complemental engaging surfaces in consequence of which a movement of the actuator effects the axial movement of said member relatively to the other member, and relatively stationary means adapted to be moved into the path of a part of the actuator to move it in one direction or the other whereby said rotary members may be clutched to rotate together or unclutched, as the case may be.

8. In combination, two complemental members, one of said members being movable into engagement with the other, an actuator rotatable with one of said members but supported independently of and movable relatively to both said members in consequence of which it is adapted to move the movable member relatively to its complemental member, and manually-operable keys held against movement longitudinally of the lines of movement of said actuator and adapted to be thrust into engagement with said actuator to move it in either direction at will and thereby effect the engagement or disengagement of the two members.

9. In combination, two complemental clutch-members adapted to be moved into clutching relation, a stationary abutment, and means supported independently of but rotatable with one of said members, and movable relatively to said members so as to be engaged by said stationary abutment and moved to thereby move said clutch members into and out of clutched relation.

10. In combination, two rotatable members having complemental engaging surfaces, a stationary abutment and a pivoted device rotatable with one of said members and in wedging relation to one of said members, said device being adapted to engage said stationary abutment and be moved about its pivot, thereby to wedge one of said members into engagement with the other.

11. In combination, two complemental clutch-members adapted to be moved into clutching relation, a stationary abutment, and an oscillatory cam rotatable with one of said members and adapted to engage said stationary abutment so as to be actuated relatively to said members and by its movement to thereby move said clutch-members into clutched relation, said cam and said abutment having complemental engaging surfaces.

12. In combination, two complemental clutch-members adapted to be moved into clutching relation, an actuator rotatable with one of said members, and adapted to move said members into clutched relation, a plurality of keys normally in inoperative position and adapted to be operated singly to operate said actuator, and stationary means for supporting said keys.

13. In combination, a shaft, two members of which one is splined upon and the other is loose upon the shaft, and of which one is axially movable and the other is axially stationary, said members having complemental surfaces for engagement, an actuator pivoted upon said shaft, and adapted to engage and move the axially movable member relatively to the other member, and a stationary abutment adapted to engage said actuator to swing it about its pivot.

14. In combination, a driving-shaft, complemental clutch members of which one is splined upon and the other is loose upon the shaft, and of which one is axially movable and the other is axially stationary, a rocking cam pivoted upon said shaft, and adapted to move the axially movable clutch member into engagement with its complemental clutch-member, a stationary abutment adapted to engage said cam to rock it on its pivot, and a collar splined on said shaft and interposed between the cam and the rocking cam, said collar and said cam having cam-surfaces adapted to be engaged when the cam is rocked by said abutment to effect the axial movement of said clutch-member.

15. In combination, a driving shaft, two pairs of complemental clutch-members, the inner members of each pair being axially movable into clutched relation to their complemental members, and each pair having one member fast on and the other member loose on the said shaft, and an oscillatory actuator supported on said shaft independently of said members for moving said inner clutch members alternately into engagement with their complemental members.

16. In combination, a driving-shaft, two pairs of complemental clutch-members, the inner members of each pair being axially movable into clutched relation to their complemental members, and each pair having one member fast on and the other member loose on the said shaft, an actuator movable on and rotatable with said shaft for moving said inner clutch-members alternately into engagement with their complemental members, and a stationary abutment for moving said actuator.

17. In combination, a driving-shaft, two pairs of complemental clutch-members, the inner members of each pair being axially movable into clutched relation to their complemental members, and each pair having one member fast on and the other member loose on said shaft, a rocking cam rotatable with said shaft and having provisions for actuating said inner clutch members alternately, and a plurality of stationary independently operable abutments for rocking said cam.

18. In combination, a driving-shaft, two pairs of complemental clutch-members, the inner members of each pair being axially movable into clutched relation to their complemental members, and each pair having one member fast on and the other member loose on said shaft, a rocking cam rotatable with said shaft, and having opposite cam-projections adapted to be brought alternately into engagement with said inner clutch-members to move them axially, and independent keys or abutments adapted to engage said cam to rock it in one direction or the other.

In testimony whereof I have affixed my signature, in presence of two witnesses.

JAMES HARTNESS.

Witnesses:
 J. M. BENNETT,
 AARON M. BAKER.